March 19, 1968   H. T. SETNAN   3,373,546
FILTER

Filed Jan. 6, 1966   2 Sheets-Sheet 1

INVENTOR
HAROLD T. SETNAN

March 19, 1968   H. T. SETNAN   3,373,546
FILTER

Filed Jan. 6, 1966   2 Sheets-Sheet 2

INVENTOR
HAROLD T. SETNAN

United States Patent Office 3,373,546
Patented Mar. 19, 1968

3,373,546
FILTER
Harold T. Setnan, Excelsior, Minn., assignor to Associated Mechanical Services, a corporation of Minnesota
Filed Jan. 6, 1966, Ser. No. 519,117
4 Claims. (Cl. 55—501)

ABSTRACT OF THE DISCLOSURE

This invention comprises a filter frame provided with a replaceable pad of filter material. The frame includes four frame sides with mitered corners connected by right angular clips. The frame sides include a groove for a reinforcing screen. Two curved lips extend toward one another from right angularly arranged walls and terminate in closely spaced relation. The marginal edges of the filter pad are engaged between these lips. An auxiliary frame of greater width may encircle the filter frame where the filter is used to replace a pair of side by side conventional filters.

---

This invention relates to an improvement in filters and deals particularly with a simple and effective means of producing a filter of the type used in heating units and air-conditioning units in which the filtering element may be changed at intervals by the user.

Conventional hot-air heaters and air-conditioning units are provided with filters which are normally disposable. These filters usually comprise an outer frame, a large mesh screen or the like, or a foraminous panel designed to act as a support and enclosed within the screen, and a filter pad of glass fibers or similar material in face contact with the screen. The producers of the heating and air-conditioning unit recommend that the filters be changed at predetermined intervals. The filters may be changed by merely replacing the entire structure with a new filter, and discarding the old.

This method of operation is convenient, and is not particularly costly at any one time. However, over a period of years, the cost of replacing the filters may add up to a considerable total. Furthermore, most owners of heating and air-conditioning equipment have a tendency to purchase the filters as they are needed, as they are bulky and not often convenient to store. As a result, it is usually necessary for the owner to stop at a hardware store or store handling the filters, two or more times each year to purchase the required filters. As this is not always convenient, the changing of filters is often delayed, resulting in inefficiency in operation.

It is a well-known fact that the actual pad of filtering material is of low cost relative to the total cost of the filter. In other words, the fibrous material which forms the filter pad may be purchased in rolls at relatively low cost. It is the supporting frame and supporting screen or foraminous panel which comprises the major portion of the cost of the filter. It is with this in mind that the present invention was devised.

An object of the present invention resides in the provision of a filter including a permanent frame to which a pad of filtering material may be secured. The frame is formed of relatively inexpensive material and supports a permanent screen. The frame includes a hollow body portion having a continuous slot in its inner surface. The slot is designed to accommodate the marginal edge of the filter pad by cutting a pad of a filtering material from a sheet or roll, and forcing the marginal edge of the pad through the slot, and effective filter is produced.

A feature of the present invention resides in the provision of a filter frame which is preferably formed of extruded plastic, four strips of which are connected together along mitered corners. The corners of the filter are held together by angular clips which frictionally engage in portions of the extruded pieces. A rectangular frame of any desired size may be formed by merely cutting the extruded strips at the required angle to fit together.

A further feature of the present invention resides in the fact that the extrusion includes a channel-shaped portion directed inwardly toward the center of the frame. This channel-shaped portion is designed to accommodate the marginal edges of the filter pads supporting screen. This screen may accordingly be merely inserted in place before the fourth and final side of the frame is attached.

A further feature of the present invention resides in the fact that means may be provided for accommodating the filter in a receiving space of a predetermined width. If the filter is designed to fit in a space originally designed to accommodate a relatively thick filter or a pair of filters, the frame may be enclosed within a channel-shaped spacer frame to accomplish the desired result. The spacer frame is arranged so that the supporting screen may be located near one surface of the frame, or else near the center of the spacer frame, as is desired.

A further feature of the present invention resides in the provision of a structure in which the filter pad may be changed in a very short period of time. In order to secure the filter pad to the frame, it is only necessary to force the marginal edge of the pad through the groove with a narrow roller or similar tool. By this means, the pad may be applied to the frame in a matter of seconds.

A further feature of the present invention resides in the provision of a filter structure in which any desired size of filter may be produced from the same elements. To increase the size of the frame, it is only necessary to increase the length of the extruded sections of the material.

These and other objects and novel features of the present invention will be more clearly and fully set forth in the following specification and claims.

In the drawings forming a part of the specification:

The filter is illustrated in general by the letter A and includes a pair of parallel sides 10 and 11, and a pair of parallel ends 12 and 13. The frame members abut together at mitered corners 14 which are at forty-five degrees to the frame sides and ends.

Figure 4:
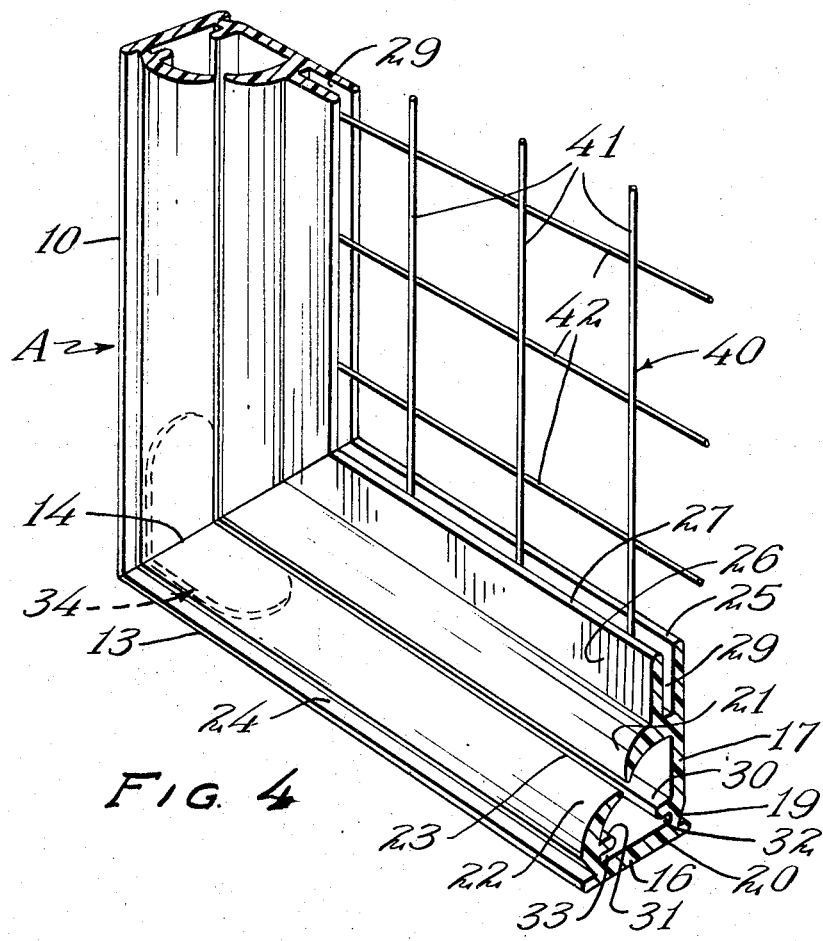
FIGURE 4 is a perspective view of a corner of the filter frame before the filter pad is attached thereto.
Figure 5:
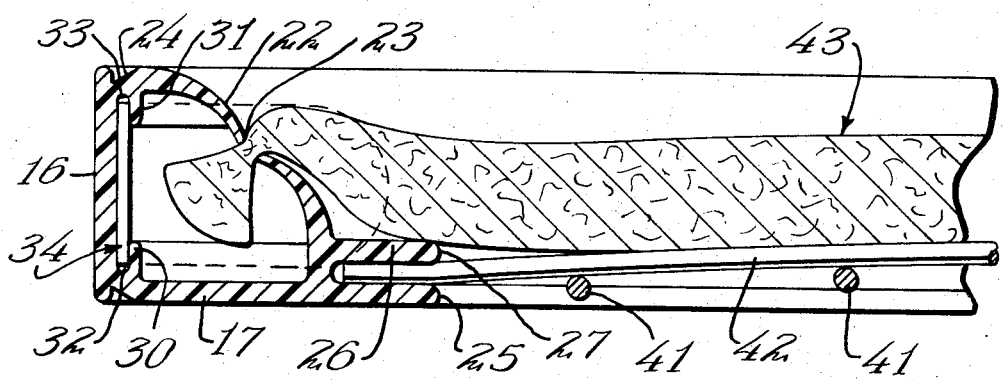
FIGURE 5 is a sectional view through a portion of the filter frame after the filter pad has been secured thereto.

The shape of the frame members 10, 11, 12 and 13, is best illustrated in FIGURES 4 and 5 of the drawings. The cross-section of all of the members is identical. Each frame member includes a peripheral wall 16 and an inwardly projecting wall 17 in right angular relation thereto extending from an edge of the peripheral wall 16. An angular notch 19 extends longitudinally of the wall 17, forming an angular groove in closely spaced relation to the flat outer surface 20 of the peripheral wall 16.

A flange 21 which is curved in cross-section extends inwardly from the inner surface of the wall 17 and curves outwardly toward the peripheral wall 16. A second curved flange 22 extends inwardly from the peripheral wall 16 and curves toward the right angular flange or wall 17. In combination, the flanges 21 and 22 present somewhat of the appearance of a quarter round molding. The curved flanges 21 and 22 terminate in closely spaced relation and are provided with a slot 23 therebetween.

A groove 24 extends longitudinally of the curved flange 22 in closely spaced relation to the flat outer surface 20 of the peripheral wall 16. The grooves 19 and 24 provide a structure wherein the marginal edges of the peripheral wall 16 extends somewhat beyond the adjoining portions of the frame members for reasons which will later be described.

The curved flange 21 extends from the surface of the wall 15 in substantially spaced relation from the edge 25 of the wall 17 which will form the inner edge of the frame member when the frame is assembled. A flange 26 extends from the surface of the curved flange 21 to extend in parallel spaced relation to the wall 17. The inner end 25 of the wall 17, and the inner edge 27 of the flange 26 terminate in substantially a common plane parallel to the flat surface 20 of the frame member. The inner end portion of the wall 17 and the flange 26 are provided with a groove 29 therebetween which is of substantially rectangular cross-section.

A rib 30 is supported upon the wall 17 in closely spaced relation to the peripheral wall 16 and extends substantially parallel to the peripheral wall 16. An opposed rib 31 is supported by the opposed surface of the curved flange 22, the ribs 30 and 31 being on substantially a common plane. The ribs 30 and 31 are spaced from the inner surface of the peripheral wall 16 to provide a pair of opposed channels 32 and 33 adjoining the peripheral wall 16.

In assembling the frame sides 10 and 11 with the frame ends 12 and 13, rigid angular clips 34 are employed. The angular clips 34 include end portions 35 and 36 which are in right angular relation, and which are preferably provided with rounded ends 37 and 39 to simplify their insertion into the frame members. The clips 34 are of a width substantially equal to the distance between the bases of the opposed grooves 31 and 32, and are of a thickness substantially equal to the distance between the peripheral wall 16 and the adjoining surfaces of the ribs 30 and 31. As the frame sections have been previously mitered or angularly cut to form the mitered joint, the joint may be readily formed by inserting one arm of the clip 34 in the grooves 32 and 33 at one end of a frame section, and then sliding the adjoining section over the other arm of the clip until the mitered surfaces are in face contact. By properly proportioning the clips relative to the space into which the clips are inserted, the frame sections frictionally engage the clips and resist separation of the frame sections. If desired, the abutting ends of the sections may be cemented or adhered together.

The pad supporting screen is indicated in general by the numeral 40. In the particular arrangement illustrated, the screen frame 40 includes a series of parallel wires 41 which extend parallel to the frame sides 10 and 11, and a second series of parallel wires 42 which extend parallel to the ends 12 and 13 of the frame. The wires or wire rods 41 and 42 are preferably welded or otherwise secured at their intersections so as to provide a rigid screen. The wires 41 are of proper length to snugly fit within the opposed grooves 29 of the frame end sections 12 and 13, while the wire rods 42 are of proper length to snugly fit within the opposed grooves 29 of the side frame members 10 and 11.

When the rectangular frame is assembled, and the supporting screen 40 is in place, the filter pad 43 may be secured to the frame. While the composition of the filter pad may vary, it normally comprises a felted mass of filaments which are resistant to the effects of heat and moisture. The pad may be perhaps three quarters of an inch or more in thickness when in its normal state. However, pads of this type may be compressed so as to be a small fraction of this thickness in the area of compression. As various types of filtering pads for this purpose are commercially available, a specific description of the material used appears unnecessary.

The pad 43 is cut to a size substantially equaling, or slightly less than, the peripheral dimensions of the frame.

In attaching the pad to the frame, the frame is usually rested with the walls 17 upon a flat surface and the side of the frame having the rounded or curved flanges 21 and 22 uppermost. The pad 43 is next centered with respect to the frame, and the marginal edge of the pad is forced through the slot 23 in each of the frame members 10, 11, 12 and 13. While this may be done through the use of a number of instruments, usually of the flat bladed type such as a spatula or putty knife, it may usually be more quickly done by means of a thin flat wheel 39 pivotally supported at 44 to the bifurcated shank 48 of an operating handle 58. The wheel 43 is preferably thin enough to force the marginal edge of the pad through each slot 23 until the marginal edges of the pad are enclosed within the hollow, quadrant-shaped body portion of the frame members. Once the marginal edge of the pad are enclosed within the frame members, these edges expand toward their normal thickness and resist removal.

The frame members are preferably formed of plastic which is sufficiently rigid to provide a stiff frame, and yet sufficiently resilient to permit the curved flanges 21 and 22 to spread apart the extent necessary to accept the edges of the blanket. When completed, the resulting structure is of substantially higher quality than the majority of disposal filters, and yet may be produced at a very low cost due to the fact that all of the frame members are of the same cross-section and may be cut from elongated strips of extruded plastic. However, the biggest advantage of the structure lies in the fact that in changing the filter, it is only necessary to remove the filter pad and to replace it with a new one. While the marginal edges of the pad are gripped so that it is virtually impossible for the pad to be accidentally disengaged, the pad may be removed from the frame by merely pulling the edges back through the slots 23 of the four frame members. A new filter pad may be inserted in the manner described. Even an unskilled worker can replace the pad in a very short period of time.

Some heating and air-conditioning units are designed to accommodate filters of a different thickness from others, and some installations are designed to accommodate two spaced filters due to the fact that the applicant's filtering pad may be denser than those of disposable filters, a single filter of the type disclosed herein will often do the job of the two filters previously used. In such an event, a spacer frame 45 may be provided to increase the thickness of the frame so that the single filter will fit in the space normally required by the two disposable filters. A spacer frame 45 is generally a channel-shaped form and includes a base panel 46 provided along opposite edges with right angularly extending parallel side walls 47 and 49. A partition wall 50 extends at right angles to the frame wall 46 parallel to, and between, the side walls 47 and 49. The space between the inner surfaces of the side wall 49 and the partition wall 50 is approximately equal to the width of the peripheral wall 16 of the rectangular frame. The distance between the side wall 47 and the partition wall 50 is substantially equal to the width of a clip 34.

Opposed ribs 51 and 52 are provided on the side wall 47 and partition wall 50 in a common plane parallel to the base wall 46 and spaced from the inner surface of the base wall 46 a distance substantially equal to the thickness of an arm of the clip 34. A similar pair of ribs 53 and 54 are provided in opposed relation on the side wall 49 and the partition wall 50, the ribs 53 and 54 being spaced from the inner surface of the peripheral wall 46 of the frame 45 equal to the distance between the surface 20 of the peripheral wall 16 of the frame and the basis of the notches 19 and 24.

Figure 1:
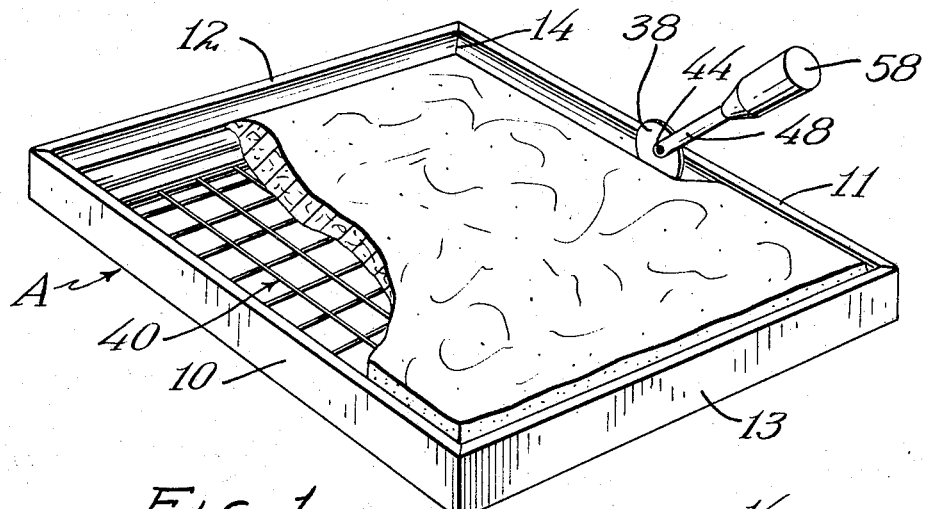
FIGURE 1 is a perspective view of the filter in partially assembled form, a portion of the filter pad being broken away to disclose the screen therebeneath.
Figure 2:
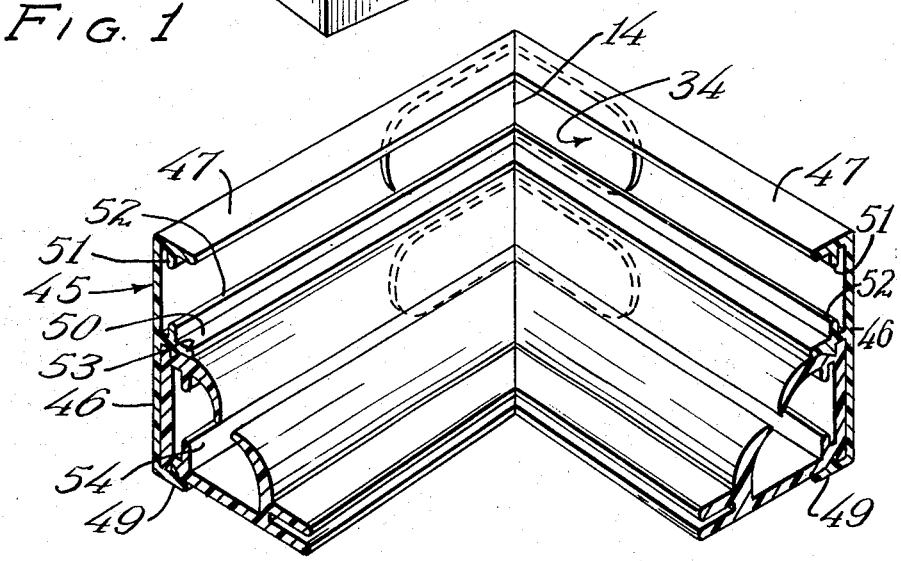
FIGURE 2 is an enlarged sectional detail of a corner of the frame.

As indicated in FIGURE 2 of the drawings, the spacer frame 45 also forms a mitered joint at each corner of the frame. In assembling the frame, each frame side and frame end of the inner filter frame is inserted in a corresponding side or end member of the spacer frame 45, the ribs 53 and 54 engaging in the grooves 19 and 24 of the corresponding inner frame member. Clips 34 are used to connect the corners of the spacer frame together, each end of the clip being frictionally inserted between the ribs 51 and 52 and the peripheral wall 46 of the outer frame. When assembled, the spacer frame increases the thickness of the inner structure.

Figure 3:
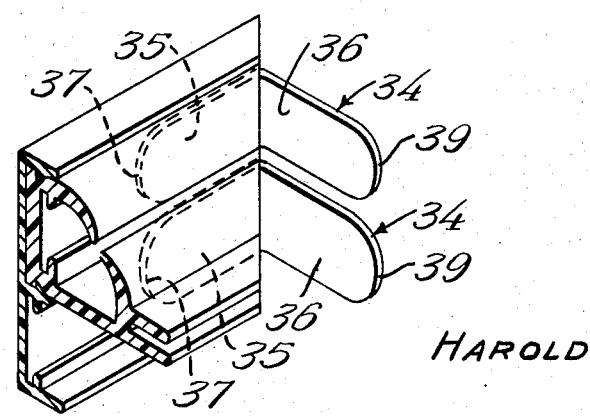
FIGURE 3 is a sectional detail showing an end of one of the frame members.

The inner filter frame may be secured to the spacer frame 45 either in the manner illustrated in FIGURE 2 of the drawings, or in the manner illustrated in FIGURE 3 thereof. In the filter screen position indicated in FIGURE 2, the supporting screen 40 is supported substantially flush with one side of the spacer frame. When in the reversed position illustrated in FIGURE 3, the suppporting screen 40 is positioned near the center of the spacer frame and spaced from opposite edges thereof.

In accordance with the patent statutes, I have described the principles of construction and operation of my improvement in filters, and while I have endeavored to set forth the best embodiment thereof, I desire to have it understood that changes may be made within the scope of the following claims without departing from the spirit of my invention.

I claim:

1. A filter construction including a generally rectangular filter frame composed of rectangularly arranged frame members of substantially the same cross-sectional shape, each frame member including two planar right angularly arranged walls connected along an edge, curved resilient flanges secured to each of said walls at a point spaced from said edge and adjacent the opposite parallel edge of said walls and curving toward one another and toward the opposite wall to define substantially a sector-shaped area between said flanges and said walls, said flanges terminating in closely spaced relation to define a spot therebetween, said frame members having diagonally extending ends connected to each other to form mitered frame corners, the outer of said walls of each frame member forming the outer periphery of said frame and the other walls of said frame members being coplanar, a right angular clip at each corner of said frame having one end frictionally engaged in said sector-shaped area inwardly of said outer wall of one frame member and having its other end engaged in said sector-shaped area inwardly of said outer wall of an adjoining frame member to hold said frame members in right angular relation, a substantially rectangular pad of filtering material having its peripheral edges extending through the slots of said frame members and engaged within said slot of the sector-shaped areas, a flange secured to the outer surface of the curved flange which is secured to said other wall of said frame members and extending parallel thereto to define between said last named flange and said other wall a groove therebetween, and a rectangular screen having its marginal edges engaged in said grooves.

2. The structure of claim 1 and including a pair of opposed ribs extending into said sector-shaped area in parallel spaced relation to said one wall and providing guide means for holding said clips in position, one of said ribs being integral with said curved flange on said one wall and the other of said ribs being on said other wall.

3. The structure of claim 1 and including a spacer frame, encircling said filter frame, said spacer frame including four spacer frame members arranged in right angular relationship, each spacer frame member being channel-shaped in section and including a base wall and parallel sides on opposite edges of said base, and a partition wall between said sides and parallel thereto, said partition wall and one parallel side wall having opposed ribs thereupon spaced from said base wall and parallel thereto, the ends of said spacer frame members being diagonal to provide mitered corners, right angular clips connecting the four corners of the spacer frame and having one end extending between said ribs and said base wall of one spacer frame member and the other end thereof extending between the ribs and the base wall of an adjoining spacer frame member, the filter frame being positioned between the partition wall and the other parallel side wall of said spacer frame members.

4. The structure of claim 3 and in which the filter frame other walls and the flanges on the outer wall of said frame members are provided with parallel longitudinally extending grooves, and said partition wall and other side wall of said spacer frame are provided with opposed ribs engageable into said grooves.

References Cited

UNITED STATES PATENTS

| | | |
|---|---|---|
| 2,111,448 | 3/1938 | Hoffman. |
| 2,754,928 | 7/1956 | Hambrecht et al. |
| 2,952,342 | 9/1960 | Schnittker. |
| 3,127,695 | 4/1964 | Driscoll et al. |
| 3,168,917 | 2/1965 | Bartels. |
| 2,783,834 | 3/1957 | Brame. |
| 3,184,052 | 5/1965 | Gledhill. |
| 3,293,834 | 12/1966 | Donachiue. |
| 3,058,279 | 10/1962 | Metcalfe. |
| 3,142,550 | 7/1964 | Kuehne. |

FOREIGN PATENTS 998,146  7/1965  Canada.

FRANK W. LUTTER, *Primary Examiner.*

B. NOZICK, *Assistant Examiner.*